United States Patent
Günther

(10) Patent No.: US 10,779,466 B2
(45) Date of Patent: Sep. 22, 2020

(54) CUTTER HEAD FOR A BRUSHCUTTER

(71) Applicant: Andreas Stihl AG & Co. KG, Waiblingen (DE)

(72) Inventor: David Günther, Kernen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 156 days.

(21) Appl. No.: 15/890,729

(22) Filed: Feb. 7, 2018

(65) Prior Publication Data

US 2018/0220583 A1 Aug. 9, 2018

(30) Foreign Application Priority Data

Feb. 8, 2017 (EP) ..................................... 17000198

(51) Int. Cl.
*A01D 34/73* (2006.01)
*A01D 34/416* (2006.01)

(52) U.S. Cl.
CPC ......... *A01D 34/73* (2013.01); *A01D 34/4165* (2013.01); *A01D 34/736* (2013.01)

(58) Field of Classification Search
CPC .......... A01D 34/73–736; A01D 34/416; A01D 34/4165
USPC ...................................... 30/276; 56/12.7, 17
See application file for complete search history.

(56) References Cited

U.S. PATENT DOCUMENTS

| | | | |
|---|---|---|---|
| 4,936,884 A * | 6/1990 | Campbell | A01D 34/4168 30/276 |
| 5,414,934 A | 5/1995 | Schlessmann | |
| 5,617,636 A * | 4/1997 | Taggett | A01D 34/736 30/276 |
| 5,622,035 A * | 4/1997 | Kondo | A01D 34/733 30/276 |
| 5,640,836 A * | 6/1997 | Lingerfelt | A01D 34/736 30/276 |
| 5,722,172 A * | 3/1998 | Walden | A01D 34/736 30/276 |
| 5,852,876 A * | 12/1998 | Wang | A01D 34/733 30/276 |
| 5,887,349 A * | 3/1999 | Walden | A01D 34/736 30/276 |
| 5,890,352 A * | 4/1999 | Molina | A01D 34/4168 30/276 |
| 6,112,416 A * | 9/2000 | Bridges | A01D 34/736 30/276 |

(Continued)

*Primary Examiner* — Jason Daniel Prone
(74) *Attorney, Agent, or Firm* — Gudrun E. Huckett

(57) ABSTRACT

A cutter head for a brushcutter has a base member with top and bottom base member parts and rotates about an axis of rotation in operation. The top base member part is fixed to the brushcutter shaft end. The bottom base member part is screwed by a screw element to the shaft end. A bearing element is arranged in the base member radially spaced to the axis of rotation. A cutting tool is secured by the bearing element to the base member between top and bottom base member parts. The bearing element is secured either to bottom or top base member part and arranged relative to the other one such that the bearing element is constructively unhindered to move relative to the other base member part at least circumferentially and such that the bottom base member part for mounting or demounting is rotatable relative to the top base member part.

26 Claims, 7 Drawing Sheets

(56) References Cited

U.S. PATENT DOCUMENTS

| | | | | |
|---|---|---|---|---|
| 6,119,350 A * | 9/2000 | Sutliff | A01D 34/736 | 30/276 |
| 6,427,341 B1 * | 8/2002 | Lee | A01D 34/4168 | 30/276 |
| 6,666,009 B1 * | 12/2003 | Brandon | A01D 34/4166 | 30/276 |
| 6,817,102 B2 * | 11/2004 | Harris | A01D 34/736 | 30/276 |
| 6,912,789 B2 * | 7/2005 | Price, III | A01D 34/733 | 30/276 |
| 7,059,106 B2 * | 6/2006 | Brandon | A01D 34/4166 | 30/276 |
| 7,905,024 B2 * | 3/2011 | Juhojuntti | B23D 47/123 | 30/276 |
| 8,061,042 B2 * | 11/2011 | Arnetoli | A01D 34/4166 | 30/276 |
| 8,069,758 B2 * | 12/2011 | Zhang | A01D 34/733 | 30/276 |
| 8,640,588 B2 * | 2/2014 | Strader | A01D 34/733 | 30/276 |
| 8,667,695 B2 * | 3/2014 | Yamaoka | A01D 34/736 | 30/276 |
| 8,769,831 B2 * | 7/2014 | Duvall | A01D 34/4166 | 30/276 |
| 8,863,395 B2 * | 10/2014 | Alliss | A01D 34/4166 | 30/276 |
| 8,925,206 B2 * | 1/2015 | Cigarini | A01D 34/733 | 30/276 |
| 8,973,274 B2 * | 3/2015 | Proulx | A01D 34/4166 | 30/276 |
| 9,010,078 B2 * | 4/2015 | MacDonald | A01D 43/16 | 30/276 |
| 9,210,838 B2 * | 12/2015 | Jerez | A01D 34/416 | |
| 9,271,442 B2 * | 3/2016 | Pellenc | A01D 34/733 | |
| 10,194,584 B2 * | 2/2019 | Gunther | A01D 34/733 | |
| 2002/0029483 A1 * | 3/2002 | Price | A01D 34/733 | 30/276 |
| 2005/0050738 A1 * | 3/2005 | Harris | A01D 34/733 | 30/276 |
| 2007/0028458 A1 * | 2/2007 | Guerra | A01D 34/4166 | 30/276 |
| 2007/0084062 A1 * | 4/2007 | Elfner | A01D 34/416 | 30/276 |
| 2009/0038163 A1 * | 2/2009 | Jerez | A01D 34/68 | 30/276 |
| 2010/0122516 A1 | 5/2010 | Nolin et al. | | |
| 2010/0287780 A1 | 11/2010 | Doane et al. | | |
| 2013/0283623 A1 * | 10/2013 | Pellenc | A01D 34/416 | 30/276 |
| 2015/0107118 A1 * | 4/2015 | Banjo | A01D 34/4168 | 30/276 |
| 2015/0216122 A1 * | 8/2015 | Jerez | A01D 34/4166 | 30/276 |
| 2015/0245558 A1 * | 9/2015 | Morabit | A01D 34/4165 | 30/276 |
| 2015/0264862 A1 * | 9/2015 | Skinner | A01D 34/4165 | 30/276 |
| 2015/0289445 A1 * | 10/2015 | Duvall | A01D 34/4165 | 30/276 |
| 2015/0342117 A1 * | 12/2015 | Alliss | A01D 34/4166 | 30/276 |
| 2016/0029556 A1 * | 2/2016 | Legrand | A01D 34/4168 | 30/276 |
| 2016/0150725 A1 * | 6/2016 | Morabit | A01D 34/4165 | 30/276 |
| 2018/0153099 A1 * | 6/2018 | Hwang | A01D 34/733 | |
| 2019/0021225 A1 * | 1/2019 | Cigarini | A01D 34/736 | |
| 2019/0380268 A1 * | 12/2019 | Nielsen | A01D 34/733 | |

\* cited by examiner

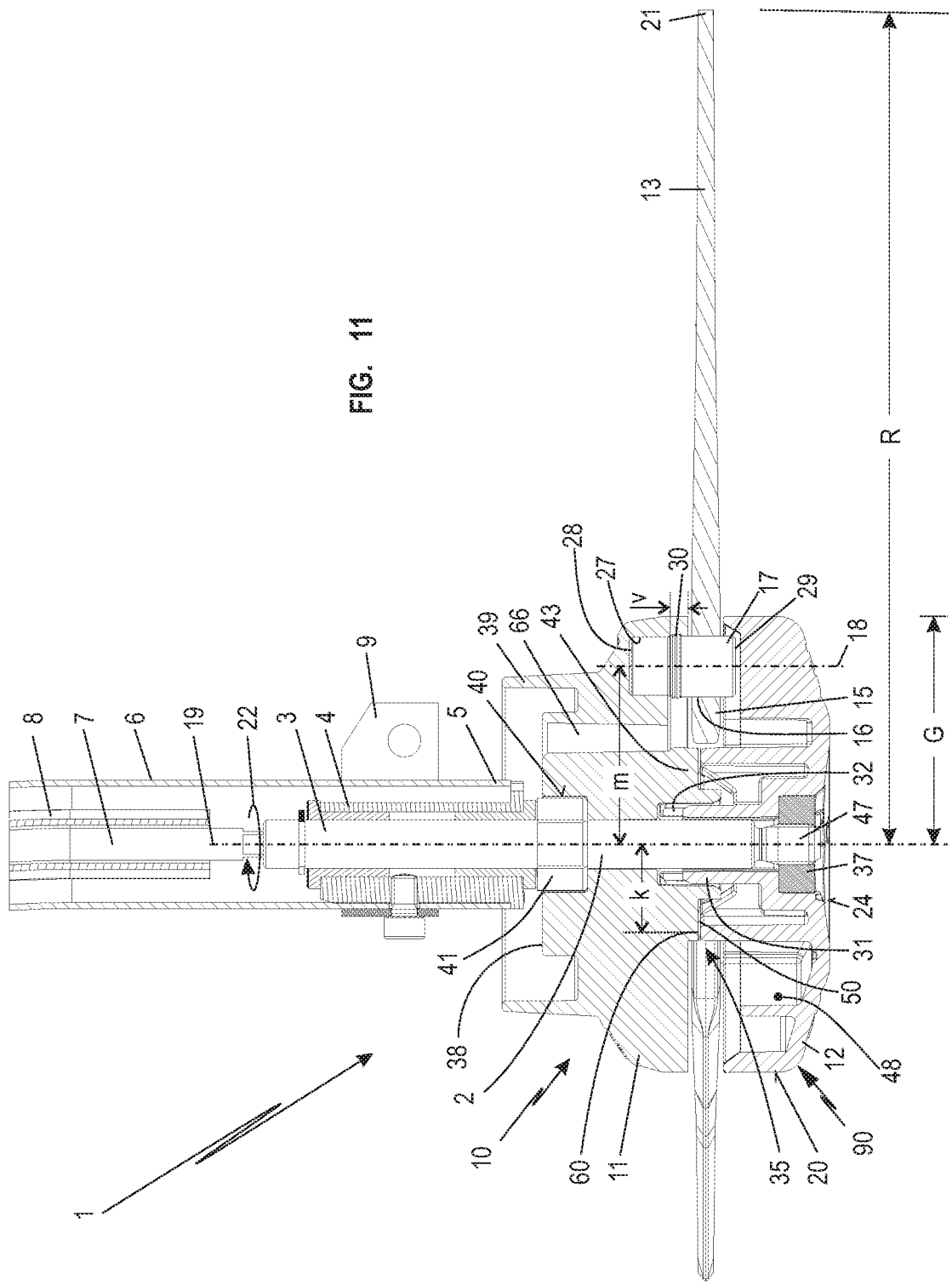

CUTTER HEAD FOR A BRUSHCUTTER

BACKGROUND OF THE INVENTION

The invention relates to a cutter head that is to be mounted on a shaft end of a brushcutter, wherein the cutter head comprises a divided base member comprised of a top base member part and a bottom base member part and wherein the base member in operation of the cutter head is driven in rotation about an axis of rotation. The top base member part is fixedly connected to the shaft end for which purpose a screw element is fixedly secured in the bottom base member part and the bottom base member part is screwed onto the shaft end. Between the base member parts at least one cutting tool is arranged for which purpose in the base member a bearing element is arranged that is positioned at a radial distance relative to the axis of rotation; the cutting tool is secured by the bearing element at the base member of the cutter head.

U.S. Pat. No. 5,722,172 discloses a brushcutter with a cutter head whose multi-part base member is comprised of two base member parts, i.e., a top base member part and a bottom base member part, with cutting tools arranged therebetween. For screw connecting the cutter head to the shaft end, a screw element is fixedly secured in the bottom base member part. The cutting tools are embodied as cutting knives and are secured at the cutter head by one bearing element each that is in the form of a bearing bolt, wherein a first bolt end of the bearing bolt is fixed in one of the base member parts and the other bolt end in the other base member part. The bearing bolt projects through a bearing receptacle of the cutting tool and the cutting tool is pivotable about the bearing axis of the bearing bolt. When the cutter head rotates about an axis of rotation, the cutting tools align themselves in radial direction outwardly due to the acting centrifugal forces and project past the periphery of the base member.

In order for the cutter head to be mounted on or demounted from the shaft end of the drive shaft, the drive shaft must be blocked. Only when the drive shaft is blocked, the screw connection between the screw element and the shaft end can be released or tightened. For this purpose, usually an insertion tool is utilized which is to be brought into engagement with the drive shaft, a gearbox or an element which is fixedly connected to the drive shaft in order to block it. Such an insertion opening is usually provided at the guide tube of the brushcutter, at a gearbox or at an element which is arranged below the guide tube, embodied separate from the cutter head, and fixedly connected to the drive shaft.

The invention has the object to further develop a cutter head of the aforementioned kind in such a way that simple mounting and demounting of the cutter head at the shaft end of the drive shaft is possible without additional components or use of a tool.

SUMMARY OF THE INVENTION

This object is solved in that the bearing element is fixed on a base member part, wherein the bearing element is constructively unhindered by the other base member part to move at least in circumferential direction of the base member relative to the other base member part such that the bottom base member part mounted on the shaft end can rotate relative to the top base member part for mounting or demounting.

According to the invention, the top base member part is connected fixedly with the shaft end. In this way, blocking of the drive shaft is possible by the user holding the top base member part without the requiring the use of a tool. The bottom base member part is secured fixedly with a screw element by means of which the bottom base member part can be screwed onto the shaft end, in particular a threaded section of the shaft end. The bearing element is provided and secured only at one of the two base member parts so that the bottom base member part of the cutter head which is mounted on the shaft end is rotatable relative to the top base member part. By screwing the bottom base member part onto the shaft end, the top base member part is secured axially on a rotary follower of the drive shaft. The base member parts are mounted as separate components on the shaft end of the drive shaft. The screw connection that secures the cutter head at the drive shaft holds together the two base member parts at the same time. For demounting the cutter head, the base member parts are rotated relative to each other wherein the user, by blocking the top base member part, can prevent the drive shaft from being rotated also. In principle, it is possible to forgo additional elements and/or tools which advantageously can be used for blocking the drive shaft end releasing the bottom base member part with the screw element. It is not mandatorily required to carry along a tool so that the weight is reduced for the user.

In operation of the cutting tool, the rotation of the base member about the axis of rotation causes centrifugal forces to act on the cutting tools so that, due to the acting centrifugal forces, the cutting tools align in radial direction outwardly and, in operation of the cutter head, project past the periphery of the base member.

In a further embodiment of the invention, between the top base member part and the bottom base member part a contact surface is formed where the base member parts in the mounted state of the cutter head are indirectly or directly resting against each other. The contact surface of the mounted base member parts is radially closer to the shaft end than a bearing bolt of a cutting tool.

According to an embodiment of the invention, the bearing element is provided in the bottom base member part. In this context, the bearing element can be positioned at an axial distance to an axially neighboring inner surface of the top base member part. When the top base member part advantageously comprises an outer rim that is positioned in radial direction outwardly relative to the bearing bolt and that is axially projecting past the inner surface of the top base member part, an axial securing action of a cutting tool secured on the bearing element can be provided. For this purpose, it can be in particular provided that the axial distance of the bearing element relative to the inner surface of the top base member part is smaller than the axial height of the outer rim of the top base member part.

In a particular further embodiment of the invention, it is provided that the screwing travel of the bottom base member part relative to the top base member part is delimited by a screw-in stop positioned between the base member parts. Advantageously, the screw-in stop is embodied on a hub of the top base member part; in particular, the screw-in stop is formed by an axial annular surface of the hub.

In a further embodiment of the invention, the screw-in stop comprises an insertion part which is arranged between the top base member part and the bottom base member part and is in particular embodied as an annular disk. The insertion part is comprised preferably of a material that is different from the material of the base member parts themselves, for example, is made of metal. The base member parts themselves are preferably manufactured of plastic material, in particular of impact-resistant plastic material.

By means of the insertion part, it is avoided that the top base member part and the bottom base member part in the area of the contact surface will fuse to each other. The insertion part ensures that in most cases the bottom base member part can still be released/removed by the user without a tool even after multiple ground contact events of the cutter head and a possible further tightening of the screw element.

The screw-in stop has correlated therewith an end face of a spacer element which is embodied in the bottom base member part. In this context, the screw-in stop provides a radial outermost contact surface between the bottom base member part and the top base member part.

In order to ensure simple assembly of the base member parts of the cutter head, it is provided that one of the base member parts has a central centering projection that engages a centering receptacle of the other base member part. Preferably, the centering projection is formed at the bottom base member part and the centering receptacle is provided at the top base member part.

In an expedient further embodiment, the centering projection is projecting past the end face of the spacer element.

The screw element provided in the bottom base member part for mounting the cutter head on the shaft end is in particular configured as a screw nut which is captively and fixedly secured in the material of the bottom base member part.

The bearing element is advantageously embodied as a bearing bolt or as a bearing sleeve with a bearing axis wherein the cutting tool in operation is pivotable about the bearing axis. The cutting tool, which is in particular embodied as a cutting knife, can align itself in radial direction under the action of the centrifugal forces caused by rotation of the cutter head and projects then past the periphery of the cutter head.

A bearing bolt provided as a bearing element comprises a first bolt end and an opposite second bolt end wherein the first bolt end is secured in the bottom base member part and the second bolt end of the bearing bolt is positioned at an axial distance relative to an axially neighboring inner surface of the top base member part.

The cutting tool which is secured at a bearing element and is advantageously embodied as a cutting knife defines with its free end a cutting circle whose radius amounts to at least 3 times, in particular at least 3.5 times, the radius of the base member of the cutter head.

The total weight of the cutting tools fastened to a base member part amounts to at least 30% to 40% of the weight of the base member part to which the cutting tool is secured. The cutter head experiences with increasing cutting circle and weight of the cutting tools a greater mechanical load of the bearing elements and of the contact location between the top and bottom base member parts.

BRIEF DESCRIPTION OF THE DRAWING

Further features of the invention result from the additional claims, the description, and the drawings illustrating an embodiment of the invention that will be explained in detail in the following.

FIG. 11 is an axial section view of the mounted cutter head with bearing bolt arranged in the top base member part.

DESCRIPTION OF PREFERRED EMBODIMENTS

Figure 1:
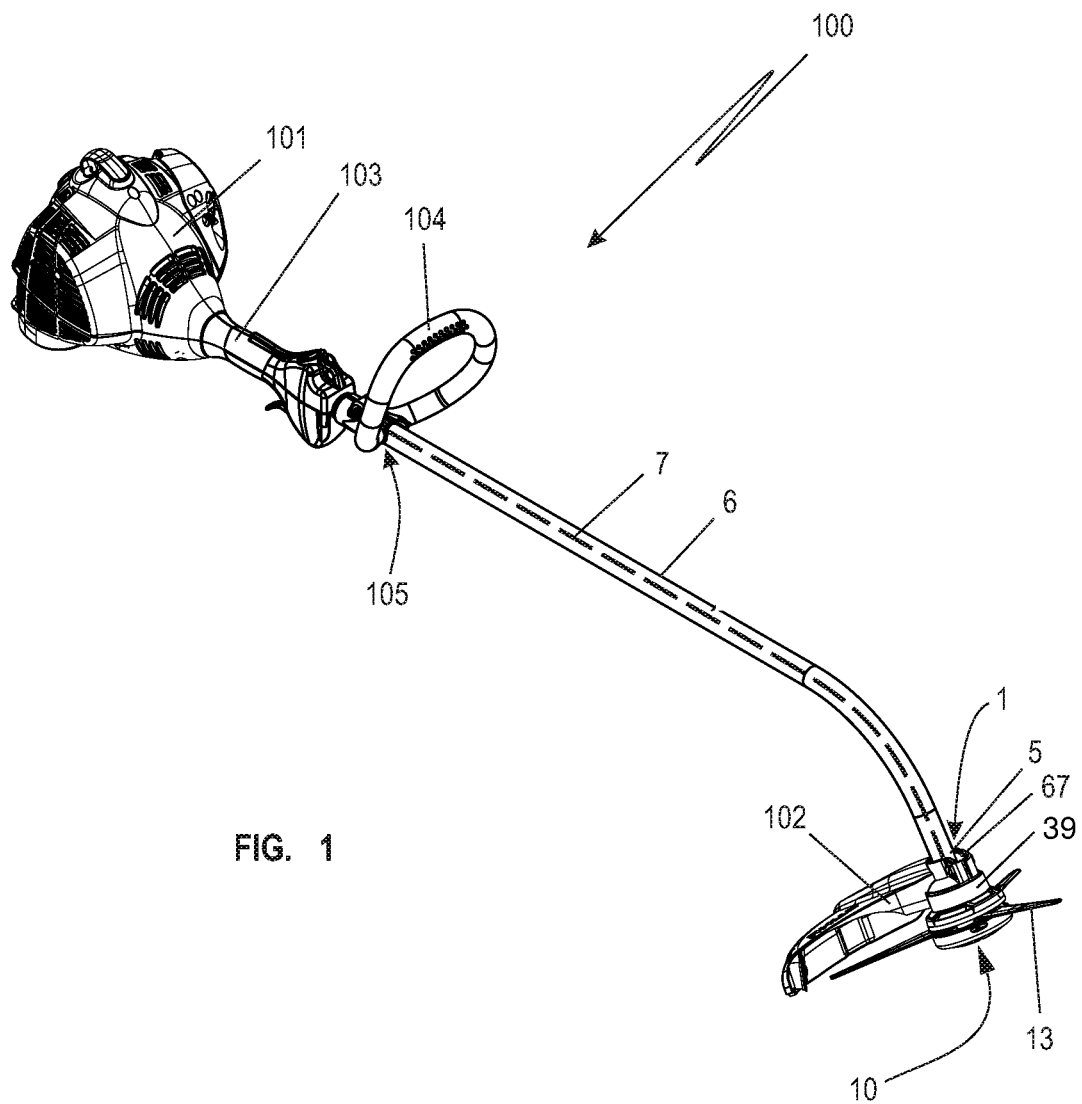
FIG. 1 shows a schematic side view of a brushcutter.

FIG. 1 discloses a power tool 100 in the form of a brushcutter in a side view. A cutter head 10 is provided at a first bottom end 5 of a guide tube 6 and a drive motor 101 is secured at the second top end 105. The drive motor 101 drives a connecting shaft that is advantageously embodied as a flexible shaft 7 and follows the curvature of the guide tube 6. An operating grip 103 is provided in the area of the top end section of the guide tube 6 and is penetrated by the guide tube 6. A round grip 104 is arranged adjacent to the operating grip 103 and is fastened to the guide tube 6.

Due to the curvature of the guide tube 6, the working position of the cutter head 10 relative to the ground is determined without requiring an angular gear. The cutter head 10 disclosed in the additional FIGS. 2 through 9 is provided in particular for a power tool 100 without angular gear at the end of the guide tube 6. The cutter head 10 is expediently arranged as close as possible to the end 5 of the guide tube 6 and is advantageously provided with a raised circumferential rim 39 forming a wrap guard so that grass is prevented from wrapping around the drive train.

Figure 2:
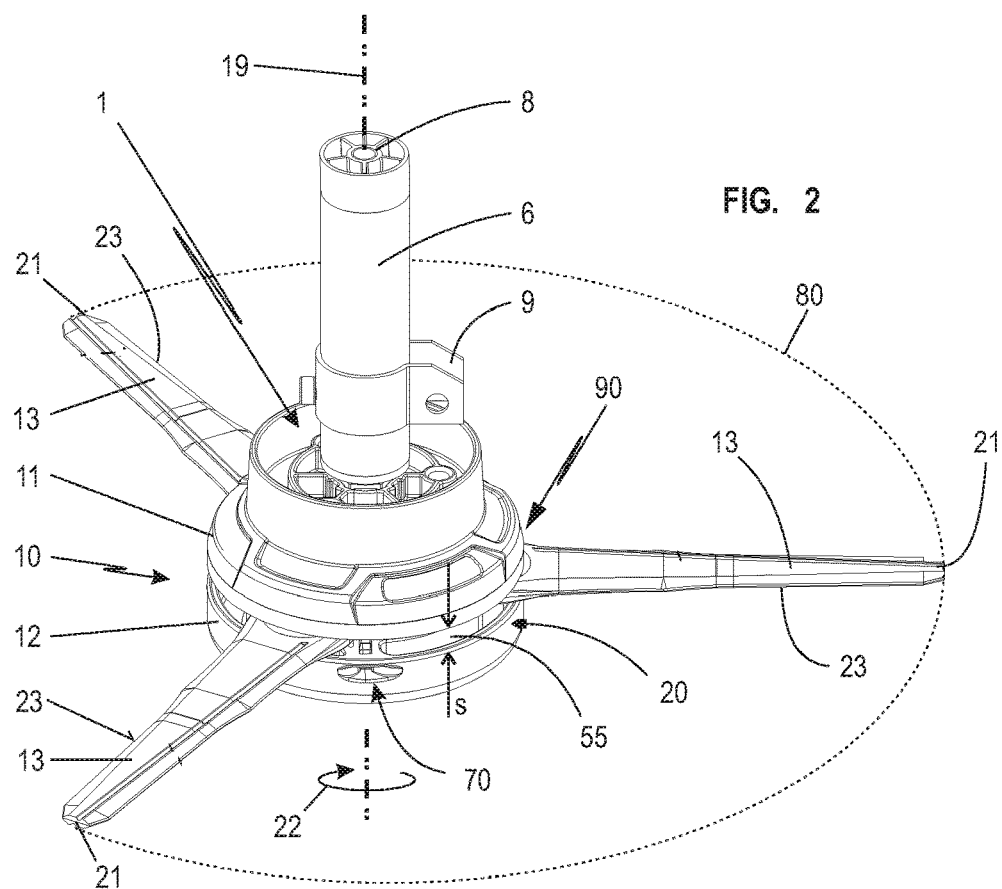
FIG. 2 is a schematic perspective illustration of a cutter head on a shaft end of a brushcutter.
Figure 3:
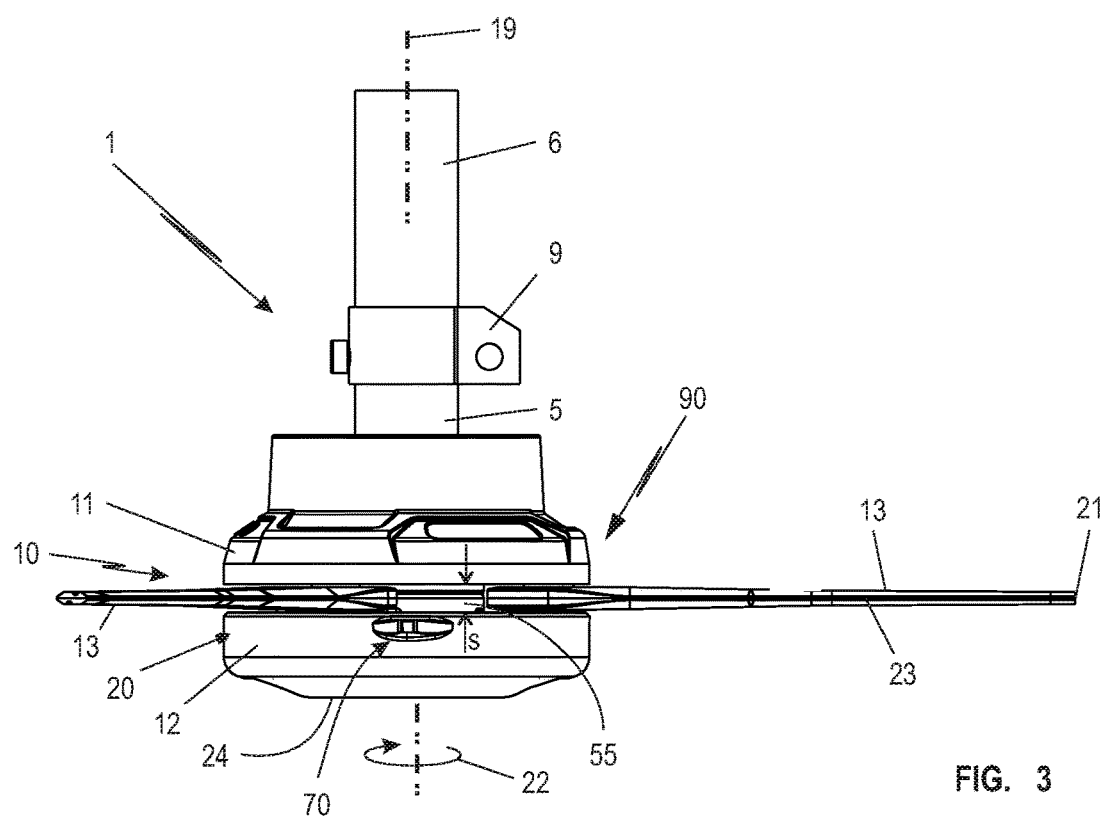
FIG. 3 shows a side view of the cutter head of FIG. 2.
Figure 4:
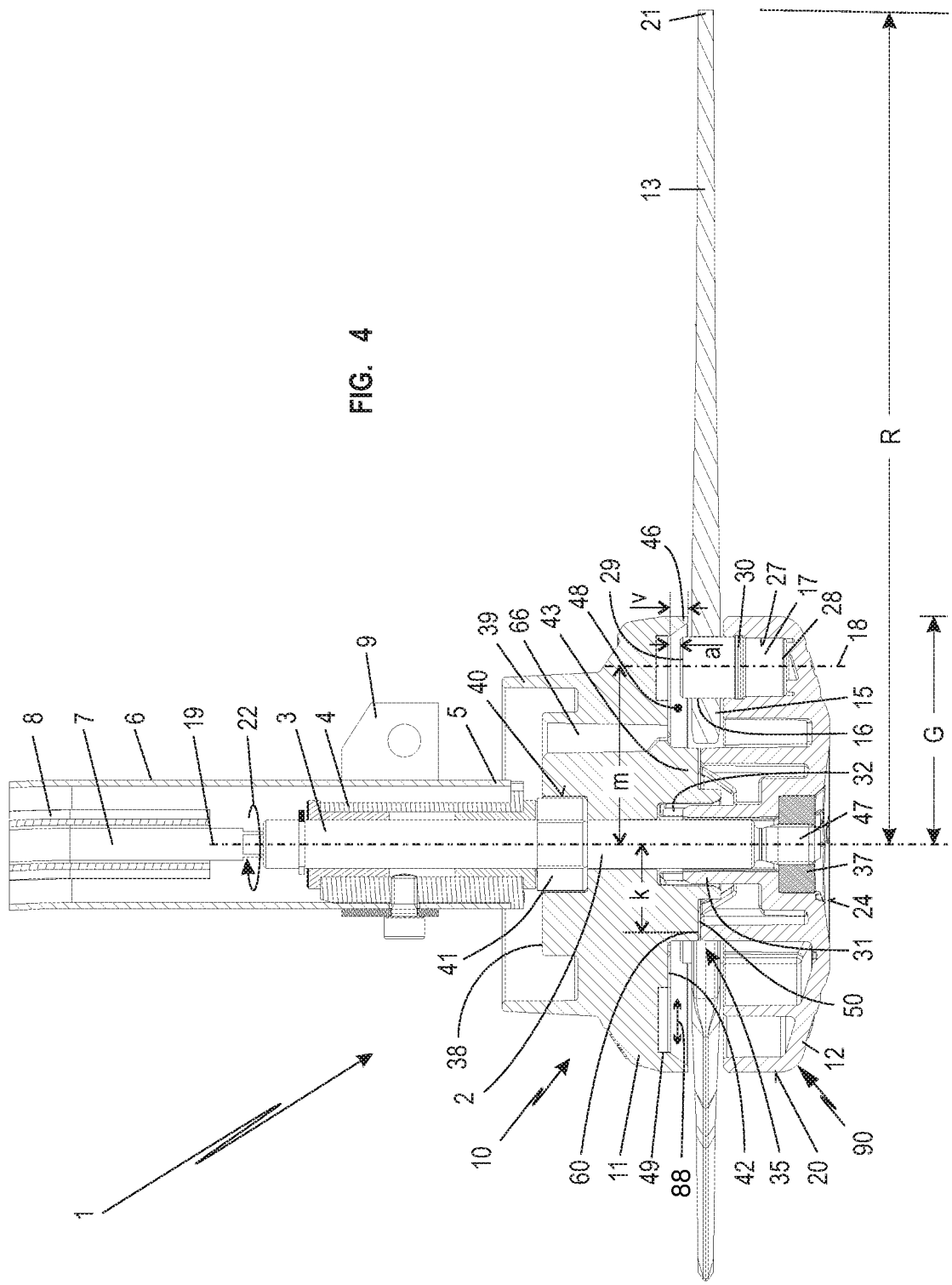
FIG. 4 is an axial section view of the mounted cutter head of FIG. 3.

In FIGS. 2 through 4, the end of the brushcutter is illustrated which is the end facing the tool. The tool-associated end 1 carries a cutter head 10 which is mounted on a shaft end 2 of the drive shaft 3. The drive shaft 3 is held in a bearing 4 which is inserted into the guide tube end 5 of the guide tube 6. In the guide tube 6, a flexible shaft 7 is extending which connects the drive shaft 3 with the drive motor 101 at the other end 105 of the guide tube 6 (FIG. 1). The flexible shaft 7 is guided and supported by a bearing sleeve 8 within the guide tube 6.

At the bottom end of the guide tube 6 there is moreover a flange 9 which is provided for attaching a guard, not shown in detail.

The cutter head 10 comprises generally a divided base member 90. The base member 90 is in particular comprised of two parts and is comprised in the embodiment of a top base member part 11 and a bottom base member part 12. In the embodiment, the top base member part 11 can be referred to in a general sense as a top base member half and the bottom base member part 12 in a general sense as a bottom base member half. In principle, the base member 90 can also be comprised of more than two base member parts.

Each base member part 11, 12 is comprised advantageously of fewer than three base elements, in particular, at least one of the two base member parts 11, 12 is comprised of only a single component. The base member 90 forms together with further additional elements, such as bearing bolts, bearing sleeves, cutting tools, screw element or the like, the cutter head 10. The base member 90, i.e., at least one base member part, serves as a support for at least one cutting tool 13 which in the embodiment is embodied as a knife 13, in particular as a plastic knife, or as a trimmer line 74.

Figure 5:
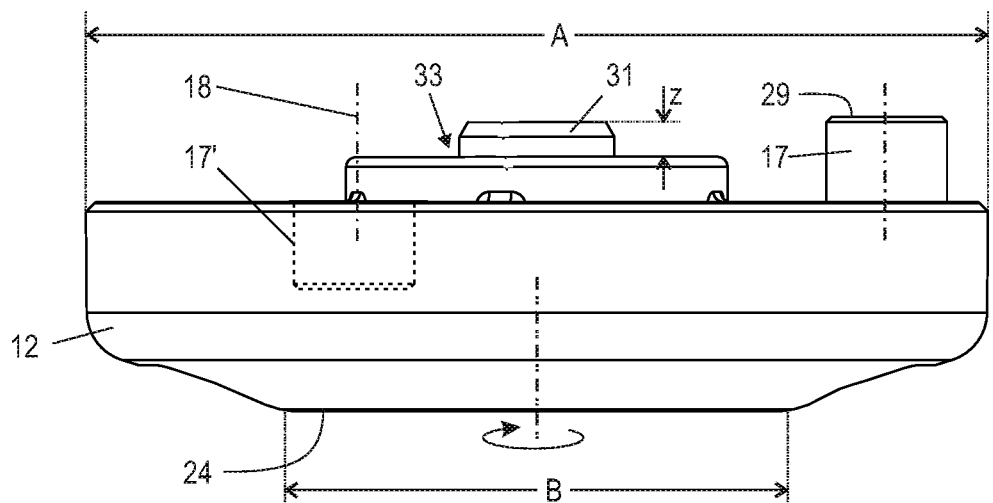
FIG. 5 is a side view of a bottom base member part with bearing elements embodied as bearing bolt or bearing sleeve.

In the embodiment, each knife 13 has at its first end 15 a bearing bore 16 which is engaged by a bearing element of the cutter head 10 that is embodied as a bearing bolt 17. The bearing elements can advantageously be formed as one piece together with the base member part. The knife 13 is pivotable about the bearing axis 18 of the bearing bolt 17. In another embodiment, it can be provided that the knife 13 at its end 15 comprises a bearing pin that engages a pin bore or a bearing sleeve 17' (FIG. 5). Upon rotation of the base member 90 about the axis of rotation 19 of the cutter head 10, the knives 13, due to the centrifugal forces acting thereon, will align in radial direction outwardly, as illustrated in FIG. 2.

The knives 13, which in operation of the cutter head 10 project past the periphery 20 of the cutter head 10, taper in the direction of their free ends 21 wherein the longitudinal edge 23 of a knife 13 which is leading in rotational direction 22 is embodied as a cutting edge.

A cutting tool 13 which is formed as a knife 13 and secured on a bearing element embodied as a bearing bolt 17 describes with its free end 21 a circle when rotating; this circle defines a cutting circle 80. The radius R of the cutting circle 80 amounts to at least 3 times to 3.5 times a length of the maximum radius G of the base member 90 of the cutter head 1 (FIG. 4). In particular, all free ends 21 of the knives 13 are positioned on a common circle which forms the cutting circle 80.

The radius G of the base member 90 amounts in particular to 40 mm to 70 mm and the radius R of the cutting circle 80 amounts to at least 120 mm, in particular more than 160 mm.

Figure 6:
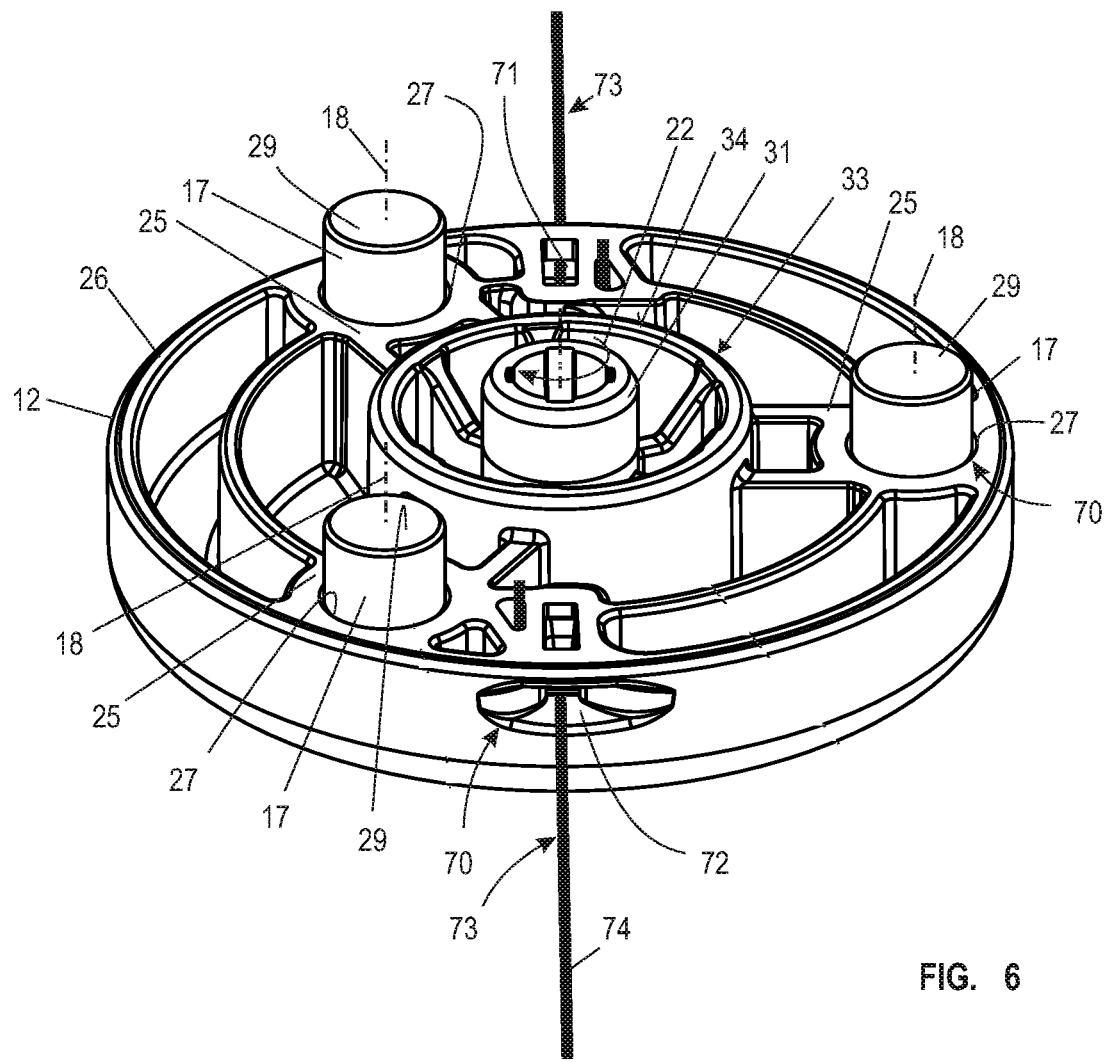
FIG. 6 is a perspective view of the bottom base member part with mounted bearing elements.
Figure 7:
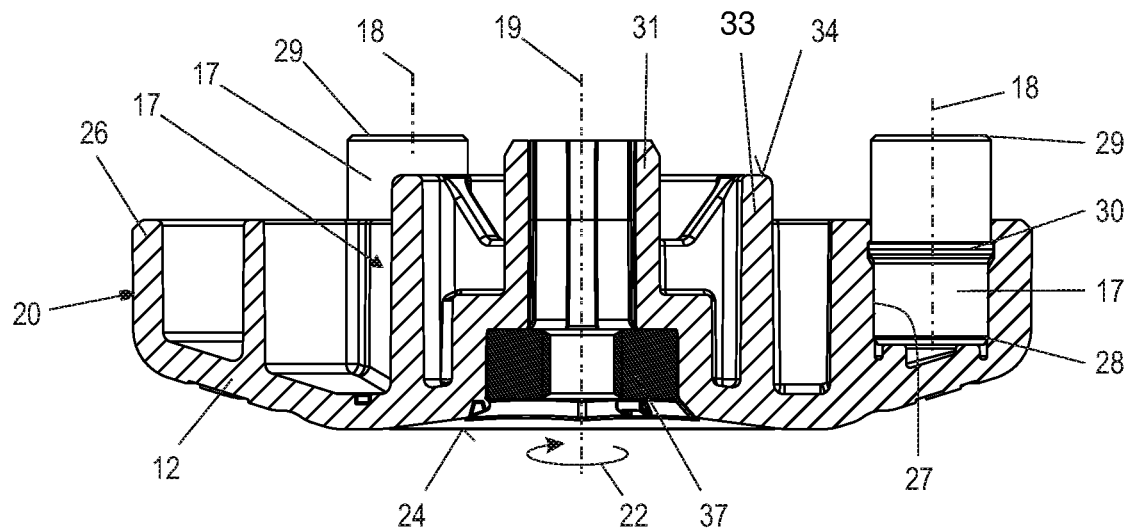
FIG. 7 is a section view of the bottom base member part with bearing elements secured thereat.

The bottom base member part 12 is illustrated in FIGS. 5 through 7. It comprises a plate-shaped external shape which can be seen in the side view of FIG. 5 and in the cross section view according to FIG. 7. A bottom 24 of the bottom base member part 12 decreases from a maximum outer diameter A to a reduced bottom diameter B.

As can be seen in particular in the perspective illustration according to FIG. 6, three bearing elements are secured in the bottom base member part 12 and are embodied as bearing bolts 17. For this purpose, the bottom base member part 12 has ribs 25 which extend radially from the axis of rotation 19 to an outer rim 26. Near the outer rim 26, receiving bores 27 are provided in the bottom base member part 12 for insertion of the bolt end 28 (FIG. 7) of the bearing bolt 17. The bearing bolt 17 can also be formed as one piece (monolithic) together with the bottom base member part 12.

The bearing bolt 17 comprises between its bolt ends 28 and 29 a fixation bead 30 which is pressed into the circumferential wall of the receiving bore 27 of the bottom base member part 12. With its bolt end 28 leading, the bearing bolt 17 is inserted into the receiving bore 27 until the fixation bead 30 is located within the receiving bore 27 and the bearing element formed as a bearing bolt 17 is axially fixedly secured in the bottom base member part 12. The orientation of the bearing bolt 17 with its bearing axis 18 is such that the bearing axis 18 is positioned parallel to the axis of rotation 19 of the base member 90. The axis of rotation 19 of the base member 90 of the cutter head 10 is at the same time a vertical axis of the bottom base member part 12.

The bottom base member part 12 comprises also a centering projection 31 which is of rotational symmetry relative to the axis of rotation 19 and which has correlated therewith a central centering receptacle 32 in the top base member part 11.

Moreover, a spacer element 33 is formed at the bottom base member part 12 whose end face 34 is interacting with the screw-in stop 35 of the top base member part 11, as illustrated in FIG. 4. A torque acting on one of the base member parts 11 or 12 is supported at the contact surface in the form of the annular surface 60 (FIG. 4) against the other base member part 12, 11. The greater the cutting circle 80 and the heavier the cutting tool 13, the greater the load on the contact surface in the form of the annular surface 60. The closer the contact surface in the form of the annular surface 60 is positioned relative to the axis of rotation 19, the greater the support forces acting between the base member parts 11, 12 as a result of the leverage. Since the spacer element 33 is positioned in radial direction inwardly of the bearing element in the form of bearing bolt 17, a greater support force is required in comparison to a construction according to the prior art in which the support is positioned in radial direction father outwardly.

The spacer element 33 is provided in the form of a spacer sleeve which is embodied as one piece (monolithic) together with the bottom base member part 12 and surrounds the centering projection 31 coaxially. The centering projection 31 projects past the end face 34 of the spacer element 33 by an axial projecting length z (FIG. 5).

At the center of the bottom 24 of the bottom base member part 12 a screw element 37 embodied as a screw nut is preferably secured. The screw element 37 is positioned coaxially to the axis of rotation 19 and is secured captively in the material of the bottom base member part 12. The screw element 37 is fixedly connected to the bottom base member part 12 in circumferential direction.

Figure 8:
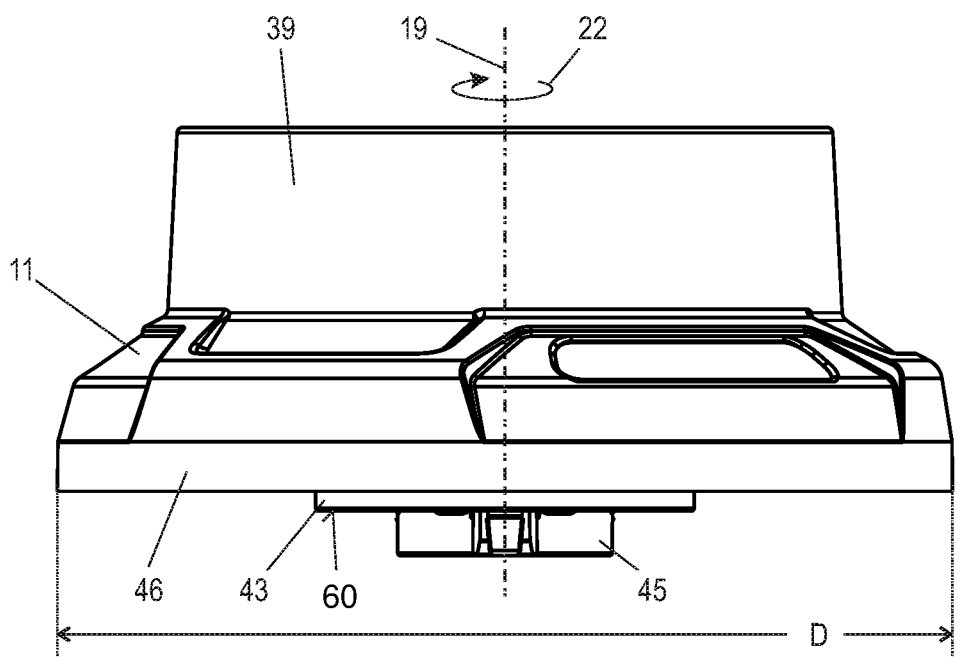
FIG. 8 is a view of the top base member part.
Figure 9:
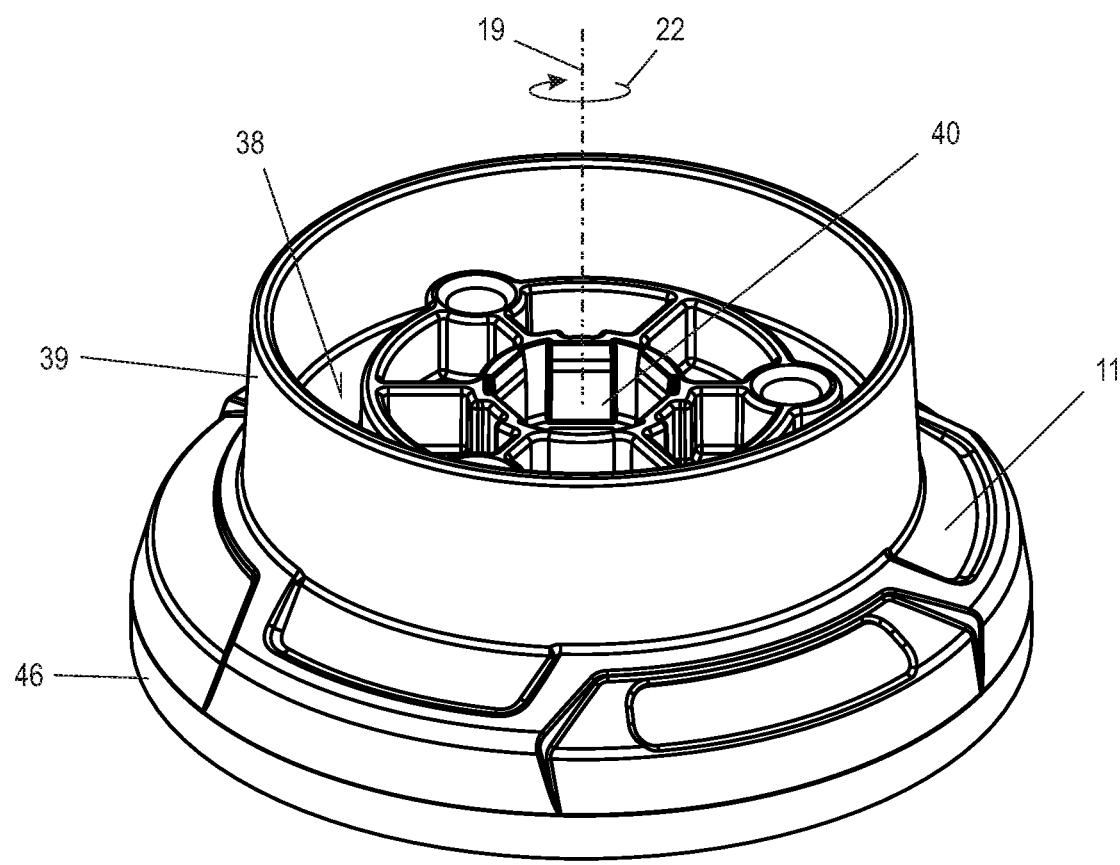
FIG. 9 is a perspective view of the top base member part of FIG. 8.
Figure 10:
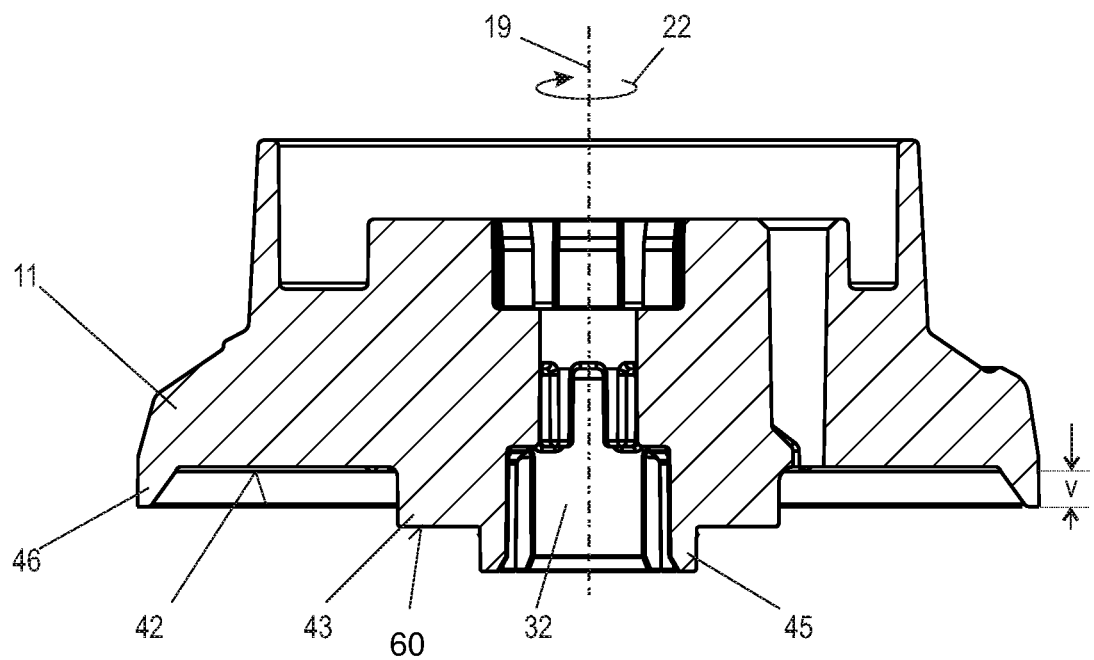
FIG. 10 is a section view of the top base member part of FIG. 8.

FIGS. 8 to 10 illustrate the top base member part 11 that, like the bottom base member part 12, is designed as a figure of revolution.

The end face 38 of the top base member part 11 which is facing the guide tube 6 comprises a raised circumferential rim 39 which extends across the free end 5 of the guide tube 6 (FIG. 4) and covers exposed parts of the drive train. The circumferential rim 39 which is acting as a collar forms also a wrap guard which substantially prevents winding of grass etc. onto or about the drive train. The end face 38 comprises moreover a central receiving contour 40. A rotary follower 41 of the drive shaft 3 engages the receiving contour 40. When the rotary follower 41 is in engagement with the receiving contour 40, as shown in FIG. 3, the top base member part 11 is connected fixedly for common rotation with the shaft end 2 of the drive shaft 3.

It can be expedient that a portion of the forces acting in operation of the cutter head are transmitted through the circumferential surfaces of the rotary follower 41 and the receiving contour 40. Advantageously, some clearance between the circumferential surfaces is provided so that the rotary follower 41 serves primarily for blocking the drive shaft 3 when the drive shaft 3 is standing still in order to release, for example, the bottom base member part 12 together with the screw element 37 from the drive shaft 3. In the embodiment, the force transmission between the drive shaft 3 and the top base member part 11 is realized through the facing end faces of the rotary follower 41 and hub 43 which are clamped against each other by tightening the screw element 37 and thus are operatively connected to each other.

The maximum outer diameter D of the top base member part 11 corresponds to the maximum outer diameter A of the bottom base member part 12. The base member parts 11, 12 are positioned so as to face each other with their respective maximum outer diameters A and D (FIGS. 3, 4).

The top base member part 11 comprises a hub 43 raised relative to the inner surface 42 of the top base member part 11 which is facing the bottom base member part 12. The hub 43 forms an annular surface 60 which is positioned coaxially to the axis of rotation 19 of the cutter head 10. The hub 43 surrounds the centering receptacle 32, whose rim 45 projects axially past the annular surface 60 of the hub 43. The raised hub 43 and the spacer element 33 end at a common diameter circle. This diameter circle is positioned in radial direction inwardly relative to the bearing elements embodied as bearing bolts 17 and in radial direction outwardly relative to the centering receptacle 32. The inner surface 42 comprises a raised outer rim 46 which projects by height v away from the inner surface 42.

As shown in FIG. 4, assembly of the cutter head 10 is realized such that the top base member part 11 is fixedly connected to the shaft end 2. The rotary follower 41 of the drive shaft 3 engages the receiving contour 40 of the top base member part 11. The screw element 37 is fixedly connected in the bottom base member part 12. Rotation of the base member parts 11, 12 relative to each other effects, on the one hand, release or fastening of the cutter head 10 on the drive shaft 3 and, on the other hand, a rotation of the base member parts 11, 12 relative to each other also effects release of the base member parts 11, 12 from each other. When the user holds tight the top base member part 11, the drive shaft 3 is blocked so that the screw element 37 together with the bottom base member part 12 can be rotated relative to the drive shaft 3. In order to enable a relative rotation of the base member parts 11, 12, the bearing element for the cutting tool 13, 73 is secured in only one of the two base member parts 11, 12 and can rotate relative to the other base member part 12, 11.

In the embodiment, the bearing element embodied as bearing bolt 17 is secured in the same base member part 12 as the screw element 37. The bearing elements are arranged in the base member part 12 which is rotatable relative to the drive shaft 3. Inertia of a cutting tool 13, 73 is transmitted to the rotatable base member part 12 and can effect an automatic further tightening of the screw element 37. It can be expedient to secure the bearing elements in the rotationally fixed top base member part 11 so that the inertia of the cutting tool 13, 73 has no effect on the screw element 37.

In the embodiment, the bearing bolt 17 that forms the bearing element is secured with only one bolt end 28, i.e., the bottom bolt end, in the bottom base member part 12. As an alternative, it can be expedient to secure the bearing bolt 17 which forms the bearing element with only one bolt end in the top base member part 11 as illustrated in FIG. 11. The cutting tools 13 of the cutter head 10 embodied as knives 13 are threaded with their bearing bores 16 onto the free bolt ends 29 of the bearing bolts 17.

In the embodiment, it is provided that the cutting tools in the from of the knives 13 of the cutter head 10 can be mounted or demounted only when a sufficiently sized gap is adjusted at the contact surface in the form of the annular surface 60 (FIG. 4) between the spacer element 33 and the hub 43 of the two base member parts 11, 12, i.e., the bottom base member part 12 is sufficiently loosened or entirely removed.

It can be expedient to embody the cutting tools 13 that are embodied as knives 13 with a type of clip-on connection at their ends 15 so that mounting or removal of the knives 13 is possible without loosening the bottom base member part 12 by radially pushing the end 15 onto the bearing bolt 17 or pulling off the end 15 from the bearing bolt 17.

For alignment of the bottom base member part 12 relative to the top base member part 11, the preferably cylindrically embodied centering projection 31 of the bottom base member part 12 engages the centering receptacle 32 of the top base member part 11. The configuration is designed such that the free end of the centering projection 31 is received by the rim 45 of the centering receptacle 32 before the threaded section 47 of the shaft end 2 engages the thread of the screw element 37.

The bottom base member part 12 is screwed onto the shaft end 2, preferably in a direction opposite to the rotational direction 22, until the receiving contour 40 of the top base member part 11 contacts the rotary follower 41 and the end face 34 of the spacer element 33 contacts the annular surface 60 of the hub 43. The end face 34 of the spacer element 33 interacts with the annular surface 60 of the hub 43 providing the screw-in stop 35, as shown in FIG. 4. The bottom base member part 12 is screwed tightly against the screw-in stop 35 so that in the area of the cutter head 10 basically no rotation of the base member parts 11 and 12 relative to each other occurs.

When the base member parts 11 and 12 are contacting each other tightly at the screw-in stop 35, between the base member parts 11 and 12 a circumferentially extending annular gap 55 (FIGS. 2 and 3) is formed that has an axial height s. Though the annular gap 55, the cutting tools in the form of knives 13 can protrude outwardly and project past the periphery 20 of the cutter head 10.

It can be expedient to design the axial height s of the annular gap 55 to be different about the periphery of the base member 90. For example, in circumferential direction of the base member 90, areas between the knives 13 can be in particular provided in which the annular gap 55 in regard to the height s is greatly reduced, expediently in these areas the annular gap is closed, i.e., no gap exists. The circumferential length of the closed area is advantageously selected such that a pivot movement of the knives 13 is maintained, i.e., is not impaired by the closed areas. Soiling of the interior 48 of the cutter head 10 can be reduced by the annular gap 55 that is reduced in regard to height s or partially closed.

Due to the fixation of the bearing elements embodied as bearing bolts 17 at only one base member part, the bottom base member part 12 can be rotated relative to the top base member part 11 which enables, on the one hand, a simple assembly of the cutter head 10 on the shaft end 2 and, on the other hand, makes it possible that the bearing elements remain free of reaction torques between the base member parts 11, 12.

The top and bottom base member parts 11, 12 by tightening of the screw element 37 are contacting each other tightly at the contact surface in the form of the annular surface 60. Only at the beginning of operation with a cutter head 10, a further tightening of the screw element 37 caused by inertia may occur in special situations.

As is illustrated furthermore in FIG. 4, the contact surface 60 between the top base member part 11 and the bottom base member part 12 where the mounted base member parts 11 and 12 are contacting each other is formed by means of the screw-in stop 35. The position of the contact surface 60 is selected such that the contact surface 60 of the screw-in stop 35 is radially closer to the shaft end 2 than the bearing element that is preferably embodied as a bearing bolt 17. As shown in FIG. 4, the contact surface 60 of the screw-in stop 35 is positioned at a radial distance k relative to the axis of rotation 19 of the cutter head 10. The bearing axis 18 of the bearing element formed as a bearing bolt 17 is positioned at a distance m relative to the axis of rotation 19 of the cutter head 10. The distance m is in particular multiple times greater than the distance k; in the embodiment, the distance m is twice or three times greater than the distance k. The knives 13 upon contact with the ground or an obstacle can deflect and fold far inwardly so that the knives 13 and/or the obstacle is protected from damage.

As indicated in FIG. 4, on the annular surface 60 of the hub 43 an insertion part 50 is arranged which is preferably embodied as an annular disk, in particular as a gliding disk. The insertion part 50 is comprised preferably of metal and acts between the annular surface 60 of the hub 43, on the one hand, and the end face 34 of the spacer element 33, on the other hand. Preferably, the insertion part 50 is comprised of a material that is different from the material of the base member parts 11, 12 which are in particular made of plastic material, preferably an impact resistant plastic material.

In mounted position according to FIG. 4, the axial top bolt end 29 of the bearing element which is formed as a bearing bolt 17 has a distance a relative to the inner surface 42 of the top base member part 11. The outer rim 46 of the top base member part 11 which is positioned in radial direction outwardly relative to the bearing elements has a height v which is greater than the distance a of the bolt end 29 relative to the inner surface 42 of the top base member part 11. In this way, the bearing element which is embodied as a bearing bolt 17 is projecting with its bolt end 29 into the interior 48 which is delimited by the outer rim 46. The axial position of the cutting tool 13, preferably embodied as a knife 13, on the free bolt end 29 of the bearing bolt 17 is constructively secured. The axial bolt end 29 of the bearing bolt 17 is unhindered in regard to movement in radial direction as well as in circumferential direction of the base member 90 by the top base member part 11.

It can be in particular provided that the bolt end 29 of the bearing element embodied as a bearing bolt 17 which is facing the top base member part 11 projects into an annular groove 49 of the top base member part 11. The annular groove 49 is indicated in FIG. 4 to the left by dashed lines and is formed coaxial to the axis of rotation 19 in the inner surface 42 of the top base member part 11. The annular groove 49 extends about a circumferential angle of 360°. In the annular groove 49 the bearing element can be supported in radial direction in accordance with the double arrow 88 at the groove walls of the annular groove 49 while the bearing element in circumferential direction of the base member 90 is not supported and can be freely displaced relative to the top base member part 11 in the annular groove 49. The bearing element in circumferential direction of the base member 90 is freely rotatable relative to the top base member part 11 so that the bottom base member part 12 mounted on the shaft end 2 is freely rotatable relative to the top base member part 11. When tilting moments are acting on the bearing element, they can still be supported by means of the groove walls of the annular groove 49.

As is shown in FIG. 6, instead of the knives 13 as cutting tools 13 also one or several trimmer lines 74 can be provided as cutting tools 73. In the embodiment, in the periphery 20 of the bottom base member part 12 a bearing element 70 for a trimmer line 74 is provided. It is comprised of a trimmer line opening 72 with a clamping arrangement 71 formed in the trimmer line opening 72 for an end of the trimmer line 74. The trimmer line 74 is secured in the clamping arrangement 71 so that upon rotation of the cutter head 10 in direction of rotation 22 the acting centrifugal forces cause alignment of the trimmer line 74 in approximate radial direction. The explanations made in connection with the knives 13 apply likewise to the trimmer lines 74.

Advantageously, the cutting head 10, in particular the top base member part 11, comprises an insertion opening 66 (FIG. 4) and the tool guard 102 has a correlated opening 67 (FIG. 1). In case the user upon rotation of the bottom base member part 12 cannot safely hold the top base member part 11, a pin is additionally pushed through the opening 67 in the tool guard 102 into the insertion opening 66 in the top base member part 11. In this way, the torque which is acting on the top base member part 11 when loosening the bottom base member part 12 is supported at the tool guard 102 which is fixedly mounted on the guide tube 6. The torque which is acting during loosening on the top base member part 11 must not be counteracted by the user. The user is provided with the possibility of gripping and rotating with both hands a bottom base member part 12 when it is "frozen".

The specification incorporates by reference the entire disclosure of European priority document 17 000 198.6 having a filing date of Feb. 8, 2017.

While specific embodiments of the invention have been shown and described in detail to illustrate the inventive principles, it will be understood that the invention may be embodied otherwise without departing from such principles.

What is claimed is:

1. A cutter head configured to be mounted on a drive shaft of a brushcutter, the cutter head comprising:
   a divided base member comprising a first base member part and a second base member part, wherein the first base member part comprises a first face facing the second base member part and further comprises a second face facing away from the second base member part, and wherein the second base member part comprises a first face facing the first base member part and further comprises a second face facing away from the first base member part;
   the base member, in operation of the cutter head, configured to be rotatably driven about an axis of rotation of the base member by a drive of the brushcutter via the drive shaft, wherein the drive shaft comprises a first shaft section and a second shaft section;
   the first base member part comprising a through passage configured to pass the drive shaft therethrough from the second face of the first base member part to the first face of the first base member part and into the second base member part, wherein the first base member part is configured to be fixedly connected to the first shaft section for rotation with the drive shaft;
   a screw element fixedly connected to the second base member part, wherein the second base member part is configured to be screwed with the screw element to the second shaft section arranged in the second base member part;
   a cutting tool arranged between the first base member part and the second base member part;
   a bearing element arranged in the base member and positioned at a radial distance relative to the axis of rotation of the base member, wherein the cutting tool is connected to the bearing element and secured by the bearing element at the base member;
   wherein the bearing element is secured to one of the second base member part and the first base member part and is arranged relative to the other one of the second base member part and the first base member part such that the bearing element is constructively unhindered in regard to moving relative to the other base member part at least in a circumferential direction of the base member and such that the second base member part is rotatable relative to the first base member part for connecting the second base member part with the screw element to the drive shaft or disconnecting the second base member part with the screw element from the drive shaft.

2. The cutter head according to claim 1, wherein a screw connection formed by screwing the screw element to the second shaft section secures the first base member part axially on a rotary follower of the drive shaft.

3. The cutter head according to claim 1, wherein a rotation of the second base member part together with the screw element relative to the first base member part effects a detachment of the cutter head from the drive shaft.

4. The cutter head according to claim 1, wherein the cutting tool is aligned in a radial direction outwardly relative to the axis of rotation of the base member, when the base member is caused to rotate about the axis of rotation of the base member by the drive of the brushcutter via the drive shaft, due to acting centrifugal forces and wherein the cutting tool projects past a periphery of the second base member part when the cutter head is operating.

5. The cutter head according to claim 1, wherein a contact surface is formed at the first base member part and wherein the second base member part contacts the contact surface when the second base member part is screwed with the screw element to the second shaft section.

6. The cutter head according to claim 5, wherein the contact surface is located closer to the axis of rotation of the base member in a radial direction than an axis of the bearing element.

7. The cutter head according to claim 1, wherein the bearing element is positioned at an axial distance relative to an axially neighboring inner surface of the first base member part.

8. The cutter head according to claim 7, wherein the first base member part comprises an outer rim positioned in a radial direction outwardly relative to the bearing element, wherein the outer rim is projecting axially past the inner surface of the first base member part.

9. The cutter head according to claim 8, wherein the axial distance of the bearing element relative to the inner surface of the first base member part is smaller than an axial height of the outer rim.

10. The cutter head according to claim 1, wherein the screwing travel of the second base member part relative to the first base member part when screwing the screw element to the second shaft section is delimited by a screw-in stop positioned at the first base member part.

11. The cutter head according to claim 10, wherein the screw-in stop is formed on a hub of the first base member part.

12. The cutter head according to claim 11, wherein the screw-in stop is formed by an axial annular surface of the hub of the first base member part.

13. The cutter head according to claim 10, wherein the screw-in stop comprises an insertion part arranged between the first base member part and the second base member part.

14. The cutter head according to claim 13, wherein the insertion part is comprised of a first material and the first and second base member parts are comprised of a second material, wherein the first material is different from the second material.

15. The cutter head according to claim 10, wherein the screw-in stop interacts with an end face of a spacer element formed at the bottom second base member part.

16. The cutter head according to claim 10, wherein the screw-in stop forms a contact surface and the first and second base member parts contact each other at the contact surface.

17. The cutter head according to claim 10, wherein the screw-in stop forms a radial outermost contact surface and the first and second base member parts contact each other at the contact surface.

18. The cutter head according to claim 1, wherein the second base member part comprises a central centering projection and the first base member part comprises a central receptacle, wherein the centering projection engages the centering receptacle.

19. The cutter head according to claim 18, wherein the centering projection projects past an end face of a spacer element formed at the second base member part.

20. The cutter head according to claim 1, wherein the first base member part comprises a central centering projection and the second base member part comprises a central receptacle, wherein the centering projection engages the centering receptacle.

21. The cutter head according to claim 1, wherein the screw element is a screw nut secured in the second base member part.

22. The cutter head according to claim 1, wherein the bearing element is a bearing bolt or a bearing sleeve and wherein the cutting tool, in operation of the cutter head, pivots about an axis of the bearing bolt or the bearing sleeve.

23. The cutter head according to claim 1, wherein the bearing element is a bearing bolt comprising a first bolt end and an opposite second bolt end, wherein the first bolt end is secured in the second base member part and the second bolt end is positioned at an axial distance relative to an axially neighboring inner surface of the first base member part, wherein the cutting tool, in operation of the cutter head, pivots about an axis of the bearing bolt.

24. The cutter head according to claim 1, wherein the cutting tool comprises a free end that defines a cutting circle when the cutting tool is rotating and wherein the cutting circle has a radius that amounts to at least 3 times a length of a maximum radius of the base member.

25. The cutter head according to claim 1, wherein up to three of said cutting tool are provided and wherein a total weight of said up to three cutting tools is at least 30% to 45% of a weight of the second base member part.

26. The cutter head according to claim 1, wherein a spacing between the first shaft section and the second face of the second base member part is greater than a spacing between the second shaft section and the second face of the second base member part.

\* \* \* \* \*